Nov. 28, 1944.  L. A. PARADISE ET AL  2,363,897
IMPLEMENT ATTACHMENT FOR TRACTORS
Filed May 17, 1943  4 Sheets-Sheet 4
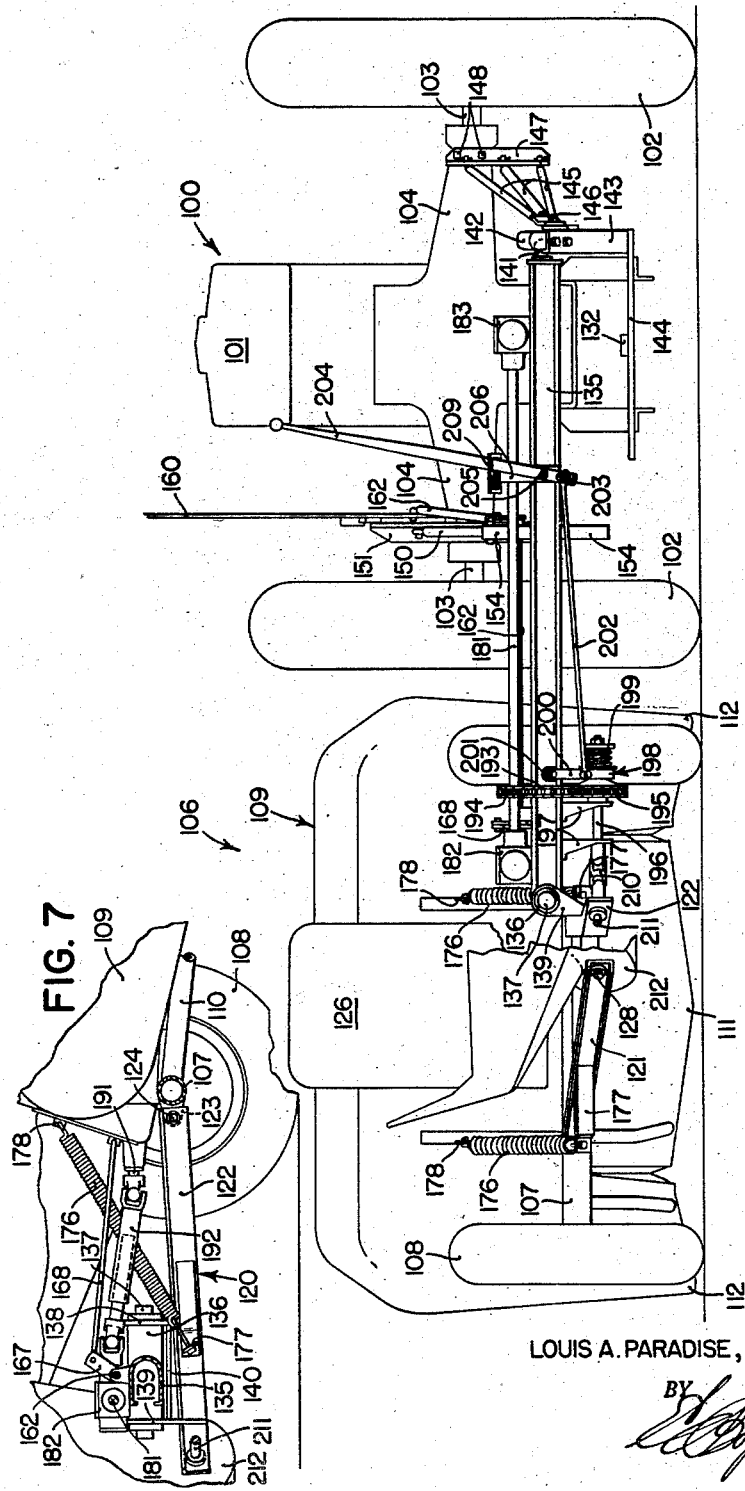
INVENTORS
LOUIS A. PARADISE, WILBUR J. COULTAS &
RUSSELL L. DORT
ATTORNEYS Patented Nov. 28, 1944

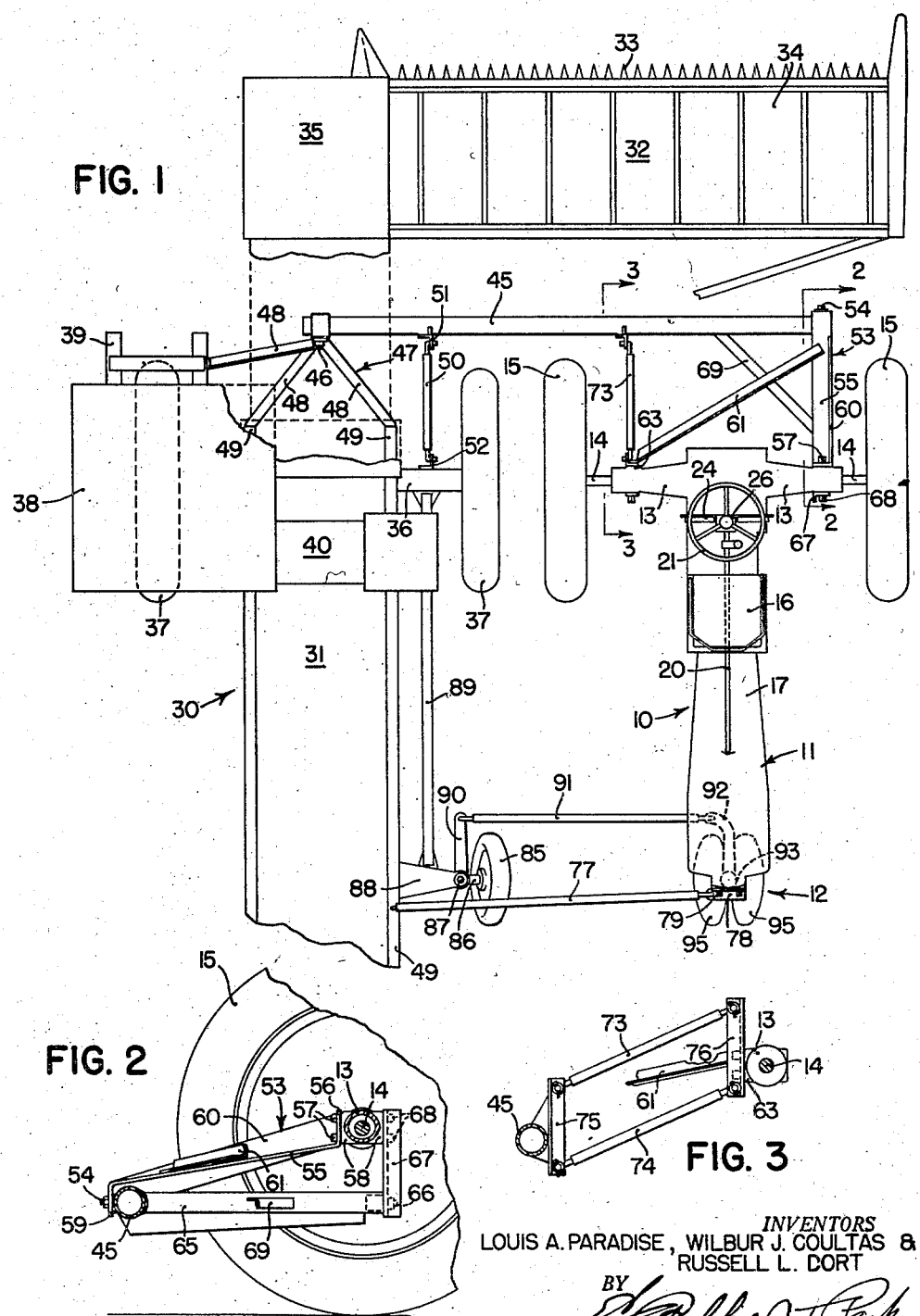

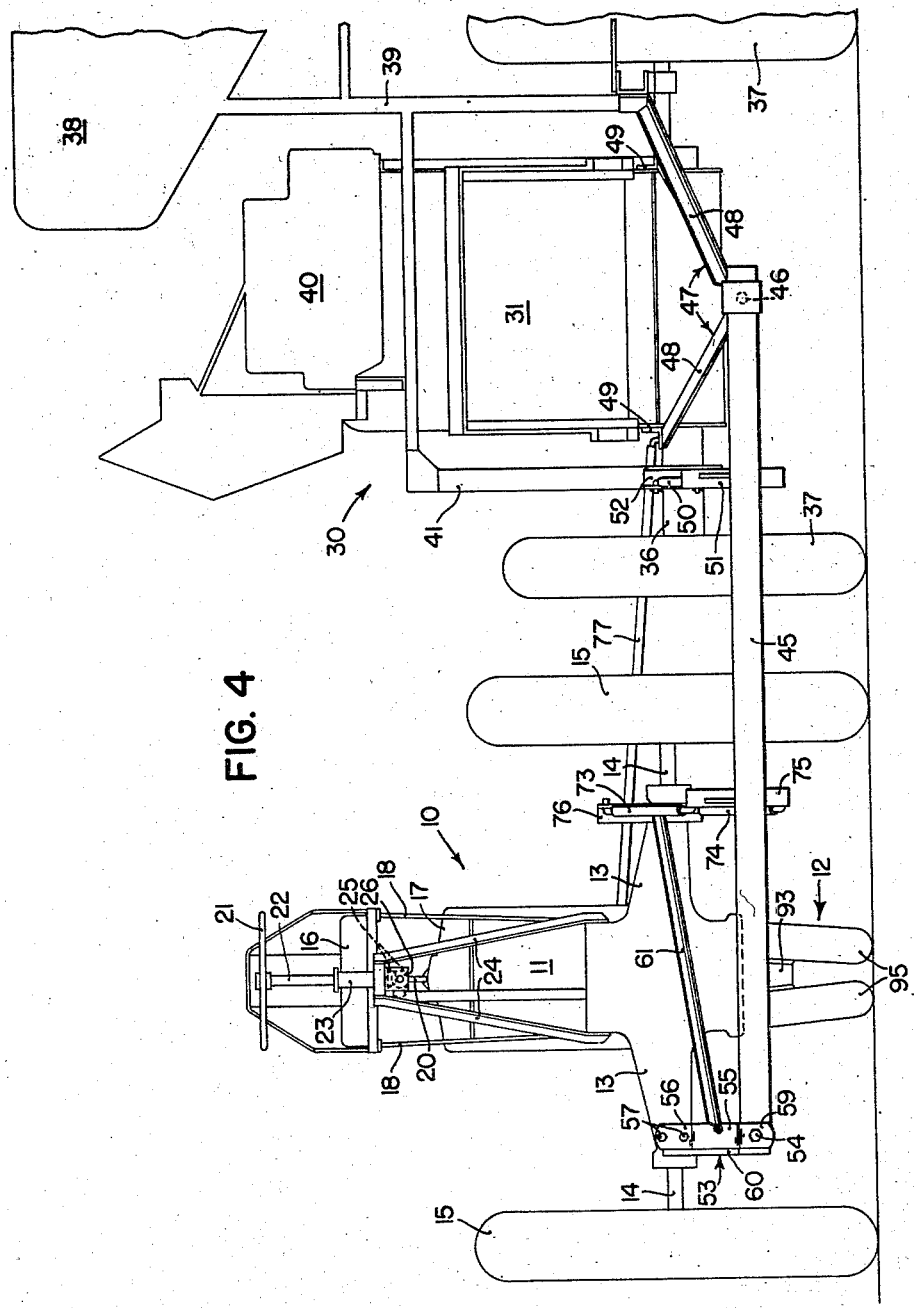

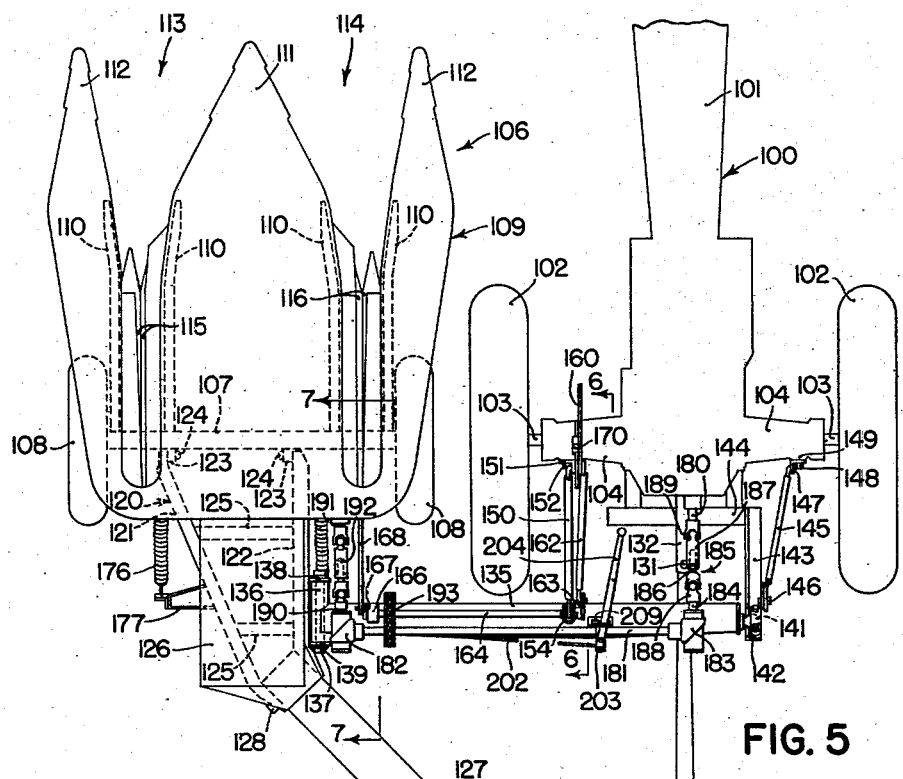

2,363,897

UNITED STATES PATENT OFFICE 2,363,897

IMPLEMENT ATTACHMENT FOR TRACTORS

Louis A. Paradise and Wilbur J. Coultas, Moline, Ill., and Russell L. Dort, Davenport, Iowa, assignors to Deere & Company, Moline, Ill., a corporation of Illinois Application May 17, 1943, Serial No. 487,384

20 Claims. (Cl. 56—10)

The present invention relates generally to implement attachments for tractors, and has for its principal object the provision of a novel and improved tractor and implement combination, in which the implement is disposed in side-by-side relation to the tractor, providing complete vision of the implement from the operator's station on the tractor, without the necessity for the operator to turn around to look rearwardly at the implement, but at the same time providing a maximum degree of flexibility in the draft connections, so that the implement can be gauged by its own supporting wheels, independent of the tractor. More specifically, it is an object of the present invention to provide a novel draft connection between an implement which is supported on its own pair of laterally spaced wheels, in laterally stable relation, alongside of a commercial form of tractor, which is also supported on its own wheels.

A co-pending application, Serial No. 435,494, filed March 20, 1942 by Coultas and Dort, now Patent No. 2,337,592, granted December 28, 1943, shows an implement of this same general nature, but which depends on the tractor for lateral support and has only one wheel of its own, on which it is carried. Such an arrangement is very satisfactory for the type of implement shown therein, a single row corn harvester, for the single supporting wheel on that implement is located closely adjacent to the single pair of snapping rolls and serves as a gauging means therefor.

In the case of an implement of greater width, however, such as a two-row corn harvester or a combine, it is preferable to gauge the implement by means of a pair of supporting wheels on the implement itself and spaced rather closely together in order that each of the pairs of snapping rolls on the corn picker can be maintained in the proper relation to the ground when operating over rough or rolling terrain. These objects are accomplished by interconnecting the implement and the tractor by means of a transversely extending draft beam, swingably connected adjacent opposite ends, respectively, to the implement and to the tractor, providing for vertical swinging movement of the beam relative to both the implement and the tractor, but including means for preventing relative horizontal swinging movement. Thus, the implement and tractor are each free to tilt laterally independently of each other when travelling over rolling ground.

A further specific object of the present invention relates to the provision of draft means for connecting a combine to a tractor in side-by-side relation and arranged so that the tractor is driven in reverse direction with respect to its conventional method of operation, thus providing for maximum visibility of the harvesting operation of the combine.

Still another object of this invention relates to the provision of a corn harvester supported on its own laterally spaced wheels alongside the tractor, and draft means extending between the harvester and the tractor for maintaining this relative position, but providing for independent flexibility of movement of the harvester and the tractor. A further object relates to the provision of means for transmitting power from the power take-off shaft of the tractor to the implement along the transversely extending draft member. A further object relates to the provision of a harvester comprising an articulated frame comprising a front section that is swingable vertically relative to the rear section, with control means supported on the tractor adjacent to the operator's station and extending along the draft member to control the raising and lowering of the front section of the implement frame.

These and other objects and advantages of our invention will be apparent to those skilled in the art after a consideration of the following description, in which reference is had to the drawings appended hereto, in which Figure 1 is a plan view of a combine operated in side-by-side relation to a tractor according to the principles of the present invention;

Figure 2 is a fragmentary sectional elevational view taken along a line 2—2 in Figure 1 and drawn to an enlarged scale;

Figure 3 is a sectional elevational view of a portion of the draft mechanism, taken along a line 3—3 in Figure 1 and drawn to the same scale as that of Figure 2;

Figure 4 is a front elevational view of the combine and tractor with the harvester platform removed to more clearly show the details of the draft connections;

Figure 5 is a plan view of a second embodiment of our invention, showing a two-row corn picker attached to a tractor according to the principles of this invention;

Figure 6 is a side elevational view taken in section along a line 6—6 in Figure 5, showing a detail of the draft connections and drawn to an enlarged scale;

Figure 7 is another sectional elevational view taken along a line 7—7 in Figure 5; and Figure 8 is a rear elevational view of the tractor and corn picker, drawn to an enlarged scale and showing the wagon elevator broken away to expose the details of the draft mechanism.

Referring now to the drawings and more particularly to Figures 1-4, inclusive, the tractor, indicated generally by reference numeral 10 comprises a narrow longitudinally extending body 11 carried on a dirigible truck 12 at one end and having a pair of laterally extending axle housings 13 fixed to the opposite end. The housings 13 carry the usual drive axles 14, on which are mounted a pair of traction wheels 15, respectively. Thus, the tractor 10 is of more or less conventional construction, except that, instead of being driven in the usual manner with the dirigible truck 12 ahead, in this embodiment the tractor is adapted to be driven in the reverse direction, with the traction wheels 15 ahead and the dirigible truck 12 behind. This type of operation is facilitated by removing the usual tractor seat and installing a seat 16 above the rear end of the fuel tank 17 on a framework 18, the latter being suitably fixed to the tractor body with the seat facing toward the axle housings 13.

The dirigible truck 12 is controlled by the conventional steering shaft 20, but the conventional steering wheel is replaced by a generally horizontally disposed wheel 21, fixed to a substantially vertical shaft 22 carried in a vertically disposed bearing member 23, which is supported on a standard 24, the latter being fixedly mounted on the body of the tractor. The lower end of the steering shaft 22 is connected to the horizontal shaft 20 by means of suitable beveled gears 25 within a gear box 26. Although the tractor can be operated in its conventional reverse gear, an additional gear reduction may, if desired, be installed in the transmission mechanism, so that the usual set of change gears can be used to drive the tractor in reverse direction. One means for accomplishing this result is disclosed in Patent No. 2,309,199, granted January 26, 1943, to Elmer McCormick. Inasmuch as the means for converting the tractor to operation in the reverse direction does not per se form any part of the present invention, further description is not believed to be necessary.

The implement in this embodiment is illustrated as a combine 30 comprising a longitudinally extending separator body 31 disposed alongside the tractor 10, and a harvester platform 32 extending laterally from the forward end of the body 31 across the end of the tractor. The platform 32 is provided with the usual cutting apparatus 33 along the forward edge thereof, and a platform conveyor 34 adapted to deliver the harvested crops from the cutting apparatus 33 laterally into the feeder house 35 at the forward end of the body 31. Inasmuch as the details of the harvesting and separating mechanism do not form a part of the present invention, no further description is considered necessary.

The harvester body 31 is carried on a transverse supporting axle 36, on the opposite ends of which are mounted a pair of supporting wheels 37, by virtue of which the combine 30 is laterally stable and does not depend upon the tractor for lateral support. A suitable grain tank 38 is mounted on a framework 39 above the stubbleward supporting wheel 37 and reference numeral 40 indicates a suitable engine for driving the separating mechanism within the housing 31. The engine 40 is mounted above the body 31 on a suitable supporting framework 41.

The implement is connected to the tractor 10 by means of a transversely disposed draft beam 45, pivotally connected by means of a longitudinally extending bolt 46 to a framework 47 comprising structural members 48 diverging from the pivotal connection to points of support on the longitudinal structural members 49 of the separator housing 31 and the framework 39. By virtue of the pivot connection 46, the transverse beam 45 is swingable vertically about a fore and aft extending axis, and the beam 45 is prevented from swinging horizontally relative to the separator body 31 by means of a longitudinally extending link 50, which is pivotally connected to a bracket 51 fixed to the beam 45 in laterally spaced relation to the pivot bolt 46, and extends rearwardly therefrom to a pivotal connection with a bracket 52, rigidly mounted on the axle 36.

The beam 45 extends laterally across the end of the tractor 10 between the latter and the harvester platform 32, the beam 45 being pivotally mounted adjacent its end, on a supporting frame 53 by means of a fore and aft extending pivot bolt 54, thus providing for swinging movement of the beam 45 relative to the tractor 10 in a transverse vertical plane about the axis of the bolt 54. The frame 53 is rigidly mounted on the axle housings 13 of the tractor, and comprises a longitudinally extending structural member 55 having an upwardly turned flange 56 fixed by bolts 57 to the implement supporting bosses 58 which are conventionally provided on the front and rear surfaces of the axle housings of most tractors. The member 55 inclines downwardly from its support on the axle housing and has a downwardly turned end portion 59, which is apertured to receive the pivot bolt 54. The member 55 is provided with a vertical flange 60 to provide sufficient strength in the member 55 for supporting the beam 45. The beam 55 is braced laterally by means of a bracing member 61, which is fixed adjacent the outer end of the beam 55 and extends generally transversely of the tractor, the other end being rigidly fixed by suitable bolts to the implement supporting boss 63 on the opposite axle housing 13. The end of the beam 45 is provided with a trunnion portion 65 extending substantially at right angles to the beam 45, the opposite end of the trunnion portion 65 being pivotally mounted on a bolt 66, supported on a bracket 67, which is fixed by bolts 68 to the implement supporting boss 58 on the side of the axle housing 13 opposite the member 55. The pivot bolts 54 and 66 are substantially in fore and aft alignment, to accommodate the vertical swinging movement about the axis of these bolts of the transverse beam 45. The trunnion portion 65 is rigidly braced to the beam 45 by means of a diagonal bracing member 69.

The beam 45 is further restrained from horizontal swinging movement relative to the tractor 10 by means of a pair of longitudinally extending vertically spaced parallel links 73, 74, which are pivotally connected between a pair of vertical brackets 75, 76, fixed to the transverse beam 45 and to the implement supporting boss 63, respectively. The parallel links 73, 74 and the trunnion member 65 permit vertical swinging movement of the transverse beam 45 but prevent not only horizontal angular movement of the beam relative to the tractor but also prevent rotation of the beam 45 about its major axis.

An additional connection between the tractor 10 and combine 30 is provided in the form of a transversely extending link 77 connected to a bracket 78, fixed to the dirigible end of the tractor 10 by bolts 79, and the link 77 is connected at its opposite end to one of the main frame members 49 of the implement body 31. The rear end of the implement 30 is supported on a dirigible wheel 85, journaled on an axle 86, which is carried on a vertical spindle 87, the latter being mounted on a supporting member 88 extending laterally from the implement body 31. The supporting member 88 is braced by means of a longitudinally extending structural member 89 to the axle 36 of the implement. The dirigible wheel is controlled by a steering connection including an arm 90 fixed to the spindle 87, a link 91 pivotally connected to the arm 90 and extending transversely to a pivot connection with a second arm 92, which is rigidly mounted on the steering post 93 of the dirigible truck 12 of the tractor. Thus, the operator controls the dirigible truck 12 and also the dirigible wheel 85 by means of the steering wheel 21. However, since the links 77 and 91 are flexibly connected at opposite ends thereof, the implement 30 and tractor 10 are each free to rise and fall as the assembly advances over uneven ground, and each is also free to tilt laterally, independent of each other throughout a limited range. It will also be noted that the implement wheels 37 are substantially in transverse alignment with the traction wheels 15 of the tractor, that is to say, the axes of the wheels 37 and 15 lie substantially in the same transverse vertical plane. Furthermore, the dirigible wheel 85 is substantially in transverse alignment with the wheels 95 of the dirigible truck 12. By virtue of the described wheel arrangement, the implement and tractor can be steered as a unit either to the right or to the left, without any appreciable skidding of any of the wheels on the ground.

Referring now more particularly to Figures 5–8, inclusive, the tractor 100 is of the same general type as the tractor 10 described hereinbefore, except that it is driven in the conventional manner with the dirigible truck (not shown) at the forward end of the narrow longitudinally extending tractor body 101 and the traction wheels 102 at the rear end of the body 101. The wheels 102 are fixed to axles 103 which are journaled in laterally extending axle housings 104 on opposite sides of the rear end of the body 101, respectively. The tractor is shown merely in outline, since it is conventional in all respects.

The corn picker 106 comprises a transverse supporting axle 107 carried on a pair of laterally spaced supporting wheels 108. A two-row sheet metal gatherer 109 is rigidly supported on the axle 107 through a plurality of forwardly extending frame members 110, which are rigidly fixed to the axle 107. The sheet metal gatherer 109 comprises a central gatherer 111 and a pair of outer gatherers 112, defining a pair of rearwardly converging slots 113, 114 adapted to receive the stalks of corn in a manner well-known to those skilled in the art and to guide them to the snapping rolls, of which there are two sets 115, 116. The longitudinal frame members 110 extend forwardly in pairs, on opposite sides of each pair of snapping rolls, respectively.

The implement 106 is provided with a rear frame section 120 comprising a pair of generally longitudinally extending beams 121, 122. pivotally connected at their forward ends to a pair of laterally spaced brackets 123 fixed to the axle 107. The rear frame members 121, 122 are pivotally connected by means of transversely aligned pivot bolts 124 to the brackets 123, and the members 121, 122 are interconnected by transverse frame members 125 to form a rigid frame section. Thus, the rear frame section 120 and the gathering unit 109 comprise an articulated implement frame, the sections of which are adapted to swing relative to each other about a transverse axis closely adjacent the axis of the supporting wheels 108. This movement is utilized to provide a vertical adjustment of the forward ends of the gatherers by holding the rear section 120 of the frame generally horizontal and then controlling the movement of the forward section 109 about the pivot axis of the bolts 124, by means which will be described later in detail.

Crop treating mechanism in the form of a husking box 126 is supported on the rear frame section 120, but since the present invention is not concerned with the details of the snapping and husking mechanism, it is not considered necessary to describe any of this mechanism in the present application. It is well-known to those skilled in the art that the ears of corn are snapped from two rows of stalks by the snapping rolls 115, 116, and the ears are conveyed rearwardly to the husking box 126, containing suitable husking mechanism for removing the husks from the ears and then delivering the husked ears to a wagon elevator, indicated by reference numeral 127. The wagon elevator 127 is pivotally mounted adjacent its lower end to the converged rear ends of the frame members 121, 122, for vertical swinging movement about the axis of the pivot 128. The wagon elevator 127 is inclined upwardly and rearwardly and laterally in a position for delivering corn into a wagon 129 disposed directly behind the tractor 100. The wagon 129 is provided with a tongue 130 which is connected by a pin 131 to the drawbar 132 of the tractor.

The implement 106 is connected to the tractor by means of a transversely disposed draft beam 135, the outer end of which is swingably connected to the rear frame section 120 by means providing for vertical swinging movement of the beam 135 relative to the frame section 120 in a transverse vertical plane. The connecting means includes a tubular bearing portion 136 fixed to the outer end of the beam 135 and substantially perpendicular thereto. The tubular portion 136 is carried on a pivot bolt 137, which extends axially through the bearing portion 136 and through a pair of longitudinally spaced brackets 138, 139, which are mounted on the longitudinal frame member 122 and are interconnected by a longitudinal brace 140. Obviously, the beam 135 is swingable vertically about the axis of the pivot bolt 137, but is prevented from swinging movement in a horizontal plane and also from rotation about its major axis relative to the rear frame section 120.

The inner end of the draft beam 135 is provided with a ball joint 141 which is carried in a socket support 142, the latter being rigidly mounted on the rear of the tractor by means of a supporting arm 143, which is rigidly fixed to the drawbar supporting framework 144 of the tractor 100. This framework is rigidly fixed to the rear axle housing of the tractor. The arm 143 is rigidly braced by means of three vertically spaced bracing members 145, which converge rearwardly and are connected to the arm 143 by a bolt 146. The forward ends of the bracing members 145 are connected at vertically spaced points to a vertical bracket 147 in the form of a structural angle member, which is securely bolted at 148 to the implement supporting boss 149 at the outer end of the right hand axle housing 104 of the tractor 100.

The ball and socket joint 141, 142 provides for universal swinging movement of the beam 135 relative to the rigid supporting arm 143, but the beam 135 is prevented from swinging rearwardly about the ball and socket joint by means of a pair of vertically spaced links 150, which are connected at their forward ends to a vertically disposed structural angle member 151, which is rigidly fixed by bolts 152 to the implement supporting boss 153 on the rear side of the left hand tractor axle housing 104 adjacent the outer end of the latter. The links 150 extend rearwardly in substantially parallel arrangement and are pivotally connected at their rear ends to a pair of vertical brackets 154, extending above and below the beam 135. Thus, it will be evident to those skilled in the art that draft is transmitted from the tractor through the parallel links to the implement, the links 150 maintaining the draft beam 135 in transverse position and preventing it from swinging rearwardly about the ball and socket joint 141, while also preventing the beam 135 from rotating about its major axis relative to the tractor. However, the links 150 permit the beam 135 to swing vertically about the ball and socket joint 141, with the result that the tractor is free to rise and fall relative to the implement or to tilt laterally about a longitudinally extending axis, independently of the implement, as the tractor and implement travel over rolling or uneven ground. Furthermore, the long bearing 136 at the outer end of the beam 135 permits the implement to rise and fall relative to the tractor and also to tilt laterally on its own wheels, independent of the tractor, during operation. However, since the beam 135 is maintained in a transversely disposed position at all times, and is prevented from horizontal swinging movement relative to either the implement or the tractor, no other draft connections are necessary, such as between the implement and the forward portion of the tractor, as is found in the prior art, thus providing an extremely simple and inexpensive draft connection, but at the same time permitting a maximum of flexibility and independence of movement of both the tractor and the implement.

The gathering unit 109 is conveniently controlled by the tractor operator by means of a hand lever 160 pivotally mounted by means of a bolt 161 on the vertical angle member 151, providing for fore and aft swinging movement about the transverse axis of the bolt 161. The lever is connected by means of a link 162 to an arm 163 fixed to the end of a transverse rockshaft 164 which is disposed above and substantially parallel to the transverse draft beam 135. The inner end of the rockshaft 164 is journaled in the upwardly extending bracket 154, while the rockshaft is journaled adjacent its outer end in a bearing 166. An arm 167 is fixed to the outer end of the rockshaft 164 and is swingably connected to a control rod 168, which extends forwardly from the arm 167 and is pivotally connected to the frame of the gathering unit 109 above the axis of the pivot bolts 123. The forward ends of the gatherers 111, 112 can be raised by pulling the control lever 160 rearwardly, thus acting through the link 162 to rock the rockshaft 164 in a counterclockwise direction, as viewed in Figure 6. This acts through the arm 167 to pull rearwardly on the control rod 168 and thereby swinging the gathering unit 109 about the transverse axis of the supporting wheels 108. Inasmuch as the axis of the pivot connection 124 between the frame sections is closely adjacent to the axis of the supporting wheels 108, there is very little movement of the husking unit when the gathering unit 109 is adjusted. Furthermore, since the control link 162 is substantially coextensive with the upper link 150, vertical swinging movement of the beam 135 relative to the tractor has very little effect on the angular position of the rockshaft 164 relative to the beam 135, and the link 168 is sufficiently close to the axis of the pivot bolt 137 so that independent movement of the tractor and implement as they travel along uneven ground has very little effect on the elevation of the gatherer points 111, 112 above the ground.

The control lever 160 is provided with the usual latch mechanism 170, engageable with a notched sector 171 fixed to the upper end of the bracket 151, for securing the lever 160 in angularly adjusted position. The bracket 151 is braced by means of a strap member 172 which is bolted at 173 to an implement supporting boss 174 formed integral with the tractor axle housing 104 on the front side of the latter opposite the boss 153. The strap member 172 extends rearwardly above and below the axle housing in rearwardly diverging relation and is secured to the upper and lower ends of the angle bracket 151 by bolts 175.

Counterbalancing springs 176 are provided on opposite sides of the husking unit 126 and each spring 176 is connected at opposite ends thereof to a pair of brackets 177, 178 rigidly fixed to the rear frame section 120 and to the gathering unit 109, respectively. The forward ends of the springs 176 are attached to the gathering units 109 at a position above the axes of the wheels 108 and of the pivot connection 123, and thus exert a force tending to support the forward end of the gathering unit.

Power is transmitted from the power take-off shaft 180 of the tractor 100 to drive the snapping rolls 115, 116 and other parts of the snapping, husking and conveying mechanism, by means of a transverse power shaft 181 journaled at opposite ends in a pair of gear boxes 182, 183, mounted adjacent the outer and inner ends of the transverse draft beam 135, respectively. The inner end of the power shaft 181 is connected through a pair of bevel gears (not shown) within the gear box 183 to a forwardly extending stub shaft 184, which is connected to the tractor power take-off shaft 180 through a flexible coupling 185. The flexible coupling 185 comprises a pair of telescoping power transmitting shaft sections 186, 187 connected by a universal joint 188, 189 to the stub shaft 184 and to the tractor power take-off shaft 180, respectively. The outer end of the power shaft 181 is connected through a pair of intermeshing bevel gears (not shown) within the gear housing 182 to a forwardly extending stub shaft 190, which is connected to a power shaft 191 on the implement through a flexible coupling 192, which is similar to the coupling 185 described above. The flexible couplings 185, 192 accommodate the independent vertical and lateral tilting movements of the tractor and implement and maintain a constant flow of power therebetween during operation.

The wagon elevator mechanism is driven from the transverse power shaft 181 through a drive chain 193, trained over a sprocket 194 fixed to the shaft 181, and over a second sprocket 195, which is journaled on a shaft 196 supported in a pair of laterally spaced bearing brackets 197. The bearing brackets 197 are fixed to the bottom of the transverse beam 135 near the outer end thereof. The sprocket 195 is disengageably connected to the shaft 196 through a clutch 198 which is normally held in clutching engagement by a spring 199. The clutch is disengaged by means of a clutch fork 200 pivoted at 201 to a bracket fixed to the transverse beam 135. The fork 200 is operated through a link 202, which extends transversely alongside the beam 135 and is connected at its inner end by a bolt 203 to the lower end of a lever 204, the latter being pivotally mounted by means of a bolt 205 on a bracket 206, which is fixed to the beam 135, as best illustrated in Figure 8. The lever 204 is shown in its clutch engaged position and is retained in that position by means of a keeper 209 attached to the upper end of the bracket 206. When the lever is moved toward the right as viewed in Figure 8, the link 202 and fork 200 are swung to the left, thereby engaging the clutch 198 and transmitting power to the elevator. The shaft 196 is connected through a universal joint 210 to the elevator drive shaft 211 journaled in the boot 212 of the elevator 127, which is broken away in Figure 8 to show the details of the power transmitting connection.

It is believed that it will now be evident to those skilled in the art that the present invention provides a simple but effective tractor and implement arrangement, which provides suficient flexibility to permit the implement to gauge itself independently of the tractor during operation and substantially without interference wih the operation of the tractor, which is also independently free to follow the contour of the ground. The implement is disposed in such a position that it is within convenient range of vision of the tractor operator at all times. We do not intend our invention to be limited to the exact details shown and described herein, except as set forth in the claims which follow.

We claim:

1. In combination, a self-propelled mobile frame, a second mobile frame adapted to be propelled thereby, said frames being disposed side by side and each frame being independently supported in laterally stable relation, and draft means interconnecting said frames comprising a transverse beam extending between said frames, means connecting one end of said beam to said self-propelled frame permitting angular movement between the latter and said beam about a fore and aft extending axis but preventing relative angular movement about a generally vertical axis, and means connecting the other end of said beam to said second frame permitting relative angular movement therebetween about a fore and aft extending axis but preventing relative angular movement about a vertical axis.

2. In combination, a tractor comprising a frame carried on a pair of transversely aligned traction wheels, a mobile frame adapted to be propelled thereby disposed alongside said tractor and having a pair of laterally spaced supporting wheels journaled on an axis disposed substantially in the same vertical plane as that of the axis of said traction wheels, and draft means interconnecting said frames comprising a transverse beam extending between said frames, means connecting one end of said beam to said self-propelled frame permitting angular movement between the latter and said beam about a fore and aft extending axis but preventing relative angular movement about a generally vertical axis, and means connecting the other end of said beam to said second frame permitting relative angular movement therebetween about a fore and aft extending axis but preventing relative angular movement about a vertical axis.

3. An implement attachment for a tractor, comprising in combination, a mobile frame adapted to travel alongside the tractor, a pair of laterally spaced ground engaging supports for said frame providing a laterally stable means of support therefor, and draft means for connecting said frame to the tractor comprising a transverse beam, means connecting one end of said beam to said implement frame permitting angular movement between the latter and said beam about a fore and aft extending axis but preventing relative angular movement about a generally vertical axis, and means for connecting the other end of said beam to the tractor including means for preventing relative angular movement about a vertical axis but permitting relative angular movement about a fore and aft extending axis.

4. An implement attachment for a tractor of the type having a longitudinally extending body carried on a pair of laterally spaced traction wheels, said attachment comprising, in combination, a frame having a pair of laterally spaced supporting wheels and adapted to travel alongside the tractor with the axis of rotation of said supporting wheels substantially in axial alignment with the axis of said tractor wheels, and draft means for connecting said frame to the tractor, comprising a transverse beam, means connecting one end of said beam to said implement frame providing for vertical swinging movement of said beam relative to said frame in a transverse plane but preventing fore and aft swinging movement relative thereto, means for swingably connecting the opposite end of said beam to the tractor for movement in a transverse vertical plane, and draft means connecting said tractor to said beam at a point spaced laterally from said swingable connecting means.

5. A draft device for connecting an implement to a tractor in side-by-side relation, comprising a transverse beam adapted to extend therebetween, means adjacent one end of said beam for pivotally connecting the latter to the implement providing for vertical swinging movement of the beam in a transverse plane relative to the implement but preventing relative horizontal swinging movement, and means adjacent the opposite end of said beam for swingably connecting the latter to the tractor providing for vertical swinging movement relative thereto but preventing relative horizontal swinging movement.

6. A draft device for connecting an implement to a tractor in side-by-side relation, comprising a transverse beam adapted to extend therebetween, means adjacent one end of said beam for pivotally connecting the latter to the implement providing for vertical swinging movement of the beam in a transverse plane relative to the implement but preventing relative horizontal swinging movement, means adjacent the opposite end of said beam for swingably connecting the latter to the tractor, and vertically swingable means spaced from the last mentioned connection for connecting said beam to said tractor at a point spaced from said swingable connection, providing for vertical movement of said beam but preventing fore and aft displacement of the implement relative to the tractor as the implement follows the ground contour independent of the tractor.

7. A draft device for connecting an implement frame to a tractor frame in side-by-side relation, comprising a transverse beam adapted to extend therebetween, means adjacent one end of said beam for pivotally connecting the latter to one of said frames providing for vertical swinging movement of said beam but preventing relative horizontal swinging movement, said pivotal connecting means comprising a trunnion member at said end of the beam and a pair of fore and aft spaced bearing supports therefor, and means adjacent the opposite end of said beam for swingably connecting the latter to the other of said frames providing for vertical swinging movement but preventing relative horizontal swinging movement relative thereto.

8. A draft device for connecting an implement frame to a tractor frame in side-by-side relation, comprising a transverse beam adapted to extend therebetween, means adjacent one end of said beam for pivotally connecting the latter to one of said frames providing for vertical swinging movement of said beam but preventing relative horizontal swinging movement, said pivotal connecting means comprising a trunnion member at said end of the beam and a pair of fore and aft spaced bearing supports therefor, means adjacent the opposite end of said beam for swingably connecting the latter to the other of said frames, and fore and aft extending vertically swingable link means connected between said beam and said other frame in laterally spaced relation to said last mentioned swingable connecting means.

9. A draft device for connecting a pair of driving and driven mobile frames together in side-by-side relation, comprising a draft beam adapted to extend transversely between said frames, means for pivotally connecting each of said frames to said beam in laterally spaced relation providing for independent rocking movement of each frame about a fore and aft extending axis, and a pair of laterally spaced, longitudinally extending vertically swingable link means for connecting said beam to said frames, respectively, to restrain said frames against horizontal angular movement relative to said beam.

10. In combination, a tractor comprising a longitudinally extending body having laterally extending axle housings carried on a pair of traction wheels, respectively, at one end of said body and dirigible wheels at the opposite end thereof, means for operating said tractor with said traction wheels ahead, an implement having a pair of laterally spaced supporting wheels disposed alongside said tractor with the implement wheels generally in transverse alignment with said tractor wheels, a transverse draft beam disposed ahead of said tractor and extending laterally toward said implement, means for swingably connecting said beam to said tractor and to said implement providing for independent lateral rocking movement thereof, and means for restraining horizontal angular movement of said tractor and implement relative to said beam.

11. In combination, a tractor comprising a longitudinally extending body having laterally extending axle housings carried on a pair of traction wheels, respectively, at one end of said body and dirigible wheels at the opposite end thereof, means for operating said tractor with said traction wheels ahead, a harvester comprising a longitudinally extending body disposed alongside said tractor and having a pair of laterally spaced supporting wheels disposed generally in transverse alignment with said tractor wheels and a harvesting platform extending laterally in front of said tractor, a transverse draft beam disposed ahead of said tractor and behind said platform and extending laterally toward said harvester body, means for swingably connecting said beam to said tractor and to said harvester providing for independent lateral rocking movement thereof, and means for restraining horizontal angular movement of said tractor and harvester relative to said beam.

12. The combination set forth in claim 11, including the further provision of a dirigible supporting wheel mounted at the rear of said body, and link means connecting said dirigible wheel to said dirigible tractor wheels to be controlled therewith.

13. In combination, a tractor comprising a longitudinally extending body having laterally extending axle housings carried on a pair of traction wheels, respectively, at one end of said body and dirigible wheels at the opposite end thereof, means for operating said tractor with said traction wheels ahead, a harvester comprising a longitudinally extending body disposed alongside said tractor and having a pair of laterally spaced supporting wheels disposed generally in transverse alignment with said tractor wheels and a harvesting platform extending laterally in front of said tractor, a transverse draft beam disposed ahead of said tractor and behind said platform and extending laterally toward said harvester body, means for swingably connecting said beam to said tractor and to said harvester providing for independent lateral rocking movement thereof, and a pair of fore and aft extending, laterally spaced, vertically swingable link means connecting said beam with said harvester and said tractor, respectively, to restrain them against horizontal angular movement relative to said beam.

14. A tractor propelled implement comprising in combination, a frame, a pair of laterally spaced supporting wheels mounted thereon, said frame being adapted to travel alongside a tractor, a transversely extending draft beam, means pivotally connecting said draft beam at the rear of said frame providing for vertical swinging movement relative thereto in a transverse plane but preventing relative horizontal swinging movement, means for pivotally mounting said draft beam on the rear of said tractor providing for vertical swinging movement relative thereto in a transverse plane, and swingable draft means spaced from said pivot means, for connecting said beam to the tractor permitting said relative vertical swinging movement but preventing relative horizontal angular movement of said beam relative to the tractor.

15. A tractor propelled implement comprising in combination, a frame, a pair of laterally spaced supporting wheels mounted thereon, said frame being adapted to travel alongside a tractor, a transversely extending draft beam, means pivotally connecting said draft beam to said frame providing for vertical swinging movement relative thereto but preventing relative horizontal swinging movement, means for pivotally mounting said draft beam on said tractor providing for vertical swinging movement relative thereto, swingable draft means spaced from said pivot means, for connecting said beam to the tractor permitting said relative vertical swinging movement but preventing relative horizontal angular movement of said beam relative to the tractor, a transversely disposed power shaft mounted on said beam, and means including a pair of flexible power transmitting devices adjacent opposite ends of said beam, respectively, for connecting said shaft to suitable driving and driven mechanisms on said tractor and implement, respectively.

16. The combination set forth in claim 15, including the further provision of a clutch device connected to said power shaft for controlling said driven mechanism, and an operating lever mounted on said beam and connected with said clutch for operating the latter.

17. A tractor propelled implement comprising in combination, a frame, a pair of laterally spaced supporting wheels mounted thereon, said frame being adapted to travel alongside a tractor, a transversely extending draft beam, means pivotally connecting said draft beam to said frame providing for vertical swinging movement relative thereto in a transverse plane but preventing relative horizontal swinging movement, means for pivotally mounting said draft beam on said tractor, providing for vertical swinging movement relative thereto, a draft link spaced laterally from said pivot means for connecting said beam to the tractor permitting said relative vertical swinging movement but preventing relative horizontal angular movement of said beam relative to the tractor, and link means spaced above said draft link and adapted to be connected between said beam and the tractor for determining the angular position of said beam about its major axis.

18. A tractor propelled implement comprising in combination, a frame, a pair of laterally spaced supporting wheels mounted thereon, said frame being adapted to travel alongside a tractor, a transversely extending draft beam, means pivotally connecting said draft beam to said frame providing for vertical swinging movement relative thereto about a fore and aft extending axis but preventing relative horizontal swinging movement, means for pivotally mounting said draft beam on said tractor, providing for vertical swinging movement relative thereto, swingable draft means spaced from said pivot means, for connecting said beam to the tractor permitting said relative vertical swinging movement but preventing relative horizontal angular movement of said beam relative to the tractor, a harvesting unit swingably connected to said frame by means providing for vertical movement relative thereto, a transverse rockshaft journaled on said beam, means connecting said rockshaft with said harvesting unit, and control means for rocking said rockshaft to raise and lower said harvesting unit.

19. A tractor propelled implement comprising in combination, a frame, a pair of laterally spaced supporting wheels mounted thereon, said frame being adapted to travel alongside a tractor, a transversely extending draft beam, means pivotally connecting said draft beam to said frame providing for vertical swinging movement relative thereto but preventing relative horizontal swinging movement and preventing rotation of said beam about its major axis relative to said frame, means for pivotally mounting said beam on the tractor providing for vertical swinging movement about a fore and aft extending axis but preventing relative horizontal angular movement and preventing rotation of said beam about its major axis relative to the tractor, a harvesting unit mounted on said frame for swinging movement between raised and lowered positions, a transversely disposed rockshaft journaled on said beam, means connecting said rockshaft with said harvesting unit, and control means for rocking said rockshaft to raise and lower said harvesting unit relative to said frame.

20. A corn harvester comprising an articulated frame including front and rear sections pivoted together on a transverse axis and adapted to travel alongside a tractor, gathering mechanism on said front section, cleaning mechanism on said rear section, a pair of laterally spaced supporting wheels mounted on said frame, a transversely disposed draft beam pivotally connected to said rear section for vertical swinging movement about a fore and aft extending axis and including means for preventing relative horizontal movement and rotation about the major axis of said beam relative to said frame, means for pivotally mounting said beam on the rear of the tractor providing for swinging movement about a fore and aft extending axis but preventing relative horizontal movement and rotation about the major axis of said beam relative to the tractor, a transversely disposed rockshaft journaled on said beam, means connecting said rockshaft with said front frame section, a control lever adapted to be mounted on the tractor, and link means connected between said lever and said rockshaft whereby the latter can be rocked to raise and lower said gathering mechanism.

LOUIS A. PARADISE.
WILBUR J. COULTAS.
RUSSELL L. DORT.